(12) United States Patent
Nulman et al.

(10) Patent No.: US 6,289,915 B1
(45) Date of Patent: Sep. 18, 2001

(54) PERMEATION AND LEAK PREVENTATIVE DESIGN FOR FUEL TANK ATTACHMENTS

(75) Inventors: Mark Nulman, West Bloomfield; Giuseppe Rossi, Dearborn, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/588,514

(22) Filed: Jun. 6, 2000

(51) Int. Cl.⁷ ..................................................... F16K 24/00
(52) U.S. Cl. ........................... 137/43; 137/202; 137/587; 251/144
(58) Field of Search ........................... 137/43, 202, 587; 251/144; 220/86.1, 89.1

(56) References Cited

U.S. PATENT DOCUMENTS

| | | |
|---|---|---|
| 5,103,865 * | 4/1992 | Hyde .................................. 137/43 X |
| 5,139,043 | 8/1992 | Hyde et al. . |
| 5,404,907 | 4/1995 | Benjey et al. . |
| 5,413,137 | 5/1995 | Gimby . |
| 5,522,417 | 6/1996 | Tomioka et al. . |
| 5,601,205 | 2/1997 | Prechtel et al. . |
| 5,775,362 * | 7/1998 | Sato et al. ............................. 137/202 |
| 5,954,091 * | 9/1999 | Leadford .............................. 137/587 |
| 5,975,116 | 11/1999 | Rosas et al. . |
| 6,019,348 * | 2/2000 | Powell ................................. 251/144 |
| 6,035,883 * | 3/2000 | Benjey ................................. 137/202 |
| 6,189,567 * | 2/2001 | Foltz ................................... 137/587 |

* cited by examiner

Primary Examiner—John Rivell
(74) Attorney, Agent, or Firm—John E. Kajander

(57) ABSTRACT

A strategy for decreasing hydrocarbon emissions from a plastic fuel tank assembly having a multilayer plastic fuel tank (10) and at least one overmolded fuel tank attachment (100). The strategy consists of two basic components. First, the swelling properties of the overmolded outerlayer (116) of the fuel tank attachments 100 are exploited to close possible leakage paths between the barrier resistant core (101) and the overmolded outerlayer (116) of the fuel tank attachment (100). Second, the barrier properties of the barrier resistant core (101) of the fuel tank attachments (100) are exploited to increase the length of the diffusion path of hydrocarbon molecules out of the multilayer plastic fuel tank assembly.

20 Claims, 1 Drawing Sheet

PERMEATION AND LEAK PREVENTATIVE DESIGN FOR FUEL TANK ATTACHMENTS

TECHNICAL FIELD

The present invention relates generally to fluid systems and more particularly to controlling emissions through attachments in multi-layer plastic vessel fluid systems.

BACKGROUND

Fuel tanks for motorized vehicles have been used for many years. Typical fuel tanks are box-like, rectangular or cylindrical in shape and can contain from 10 to 30 gallons or more of a liquid fuel. Most of the current fuel tanks installed in motorized vehicles today are typically plastic or metallic in nature. However, fuel may be lost through joints between metal sections, from an instrument sensor port, from the fuel line leading to and from the engine, or from the fuel neck during refueling procedures. Further, in the case of plastic tanks, fuel may be lost through the plastic itself.

Recently, improvements to fuel tank technology have been directed to the manufacture of fuel tanks from thermoplastic, composite, or thermosetting materials using a variety of laminate or composite structures. One problem arising from the use of such materials in a fuel tank relates to increased permeability of fuel when compared to metal tanks.

To decrease the emission of fuel from these plastic tanks, improvements have focused on adding barrier layers resulting in tanks having multilayer walls. For example, U.S. Pat. No. 3,616,189 to Harr teaches an improved container having multiple layers including a nylon barrier film. However, the manufacture of multilayered or laminate materials often involves complex, expensive processing steps and expensive materials.

Another way to improve barrier properties of multi-layer structures involve adding specific chemical barrier materials to the surface of tanks or to the thermoplastic compositions used to make the tanks. For example, Walles, U.S. Pat. No. 3,740,258 and Shefford, U.S. Pat. No. 4,371,574 teaches that the addition of sulphonic acid or sulphonate groups on the surface of tank materials can improve barrier properties. Further, Wood, U.S. Pat. No. 5,928,745 adds a cyclodextrin barrier additive to a thermoplastic material used in at least one layer of a multi-layer thermoplastic fuel tank. While many of these systems improve barrier properties, significant improvements may still be achieved.

While the above solutions have improved the barrier properties of multi-layer fuel tank systems, these systems do not address the residual permeation problems occurring at attachment regions on the tank. Fuel or fuel vapor may escape through leak paths between layers of the plastic fuel tank or along exposed surfaces between the attachments and the overmolding.

SUMMARY OF THE INVENTION

It is thus an object of the present invention to exploit the swelling properties in overmolded attachments to a multi-layer fuel tank to close possible leakage paths at the interface between the different materials making up the overmolded attachments.

It is another object of the present invention to exploit the barrier properties of the materials used in overmolded attachments to increase the length of the diffusion path for the hydrocarbon molecules.

The above objects are accomplished by redesigning the overmolded components in four ways. First, cavities or grooves are added to the design of the barrier portion of the multilayer design, allowing the high-density polyethylene overmolding to swell within the cavity or groove and close the leak path at the interface between the two materials.

Second, the polyethylene overmolding in the area corresponding to the tank wall is molded conical rather than cylindrical so as to create a weld between the conical portion of overmolding material and the tank wall. This ensures that no gaps will exist between the tank wall and the attachment.

Third, the diffusion path of hydrocarbon molecules within the high density polyethylene overmolding is lengthened to decrease the permeation of hydrocarbon molecules through the attachment.

Fourth, barrier cores are added to the foot of the attachment to generate compressive stresses in the polyethylene layer to press the polyethylene layer against the barrier layer to further interrupt any leak path in these regions. This presence of barrier cores provides some additional protection against permeation.

Other objects and advantages of the present invention will become apparent upon considering the following detailed description and appended claims, and upon reference to the accompanying drawings.

DESCRIPTION OF THE PREFERRED EMBODIMENT(S)

Figure 1:
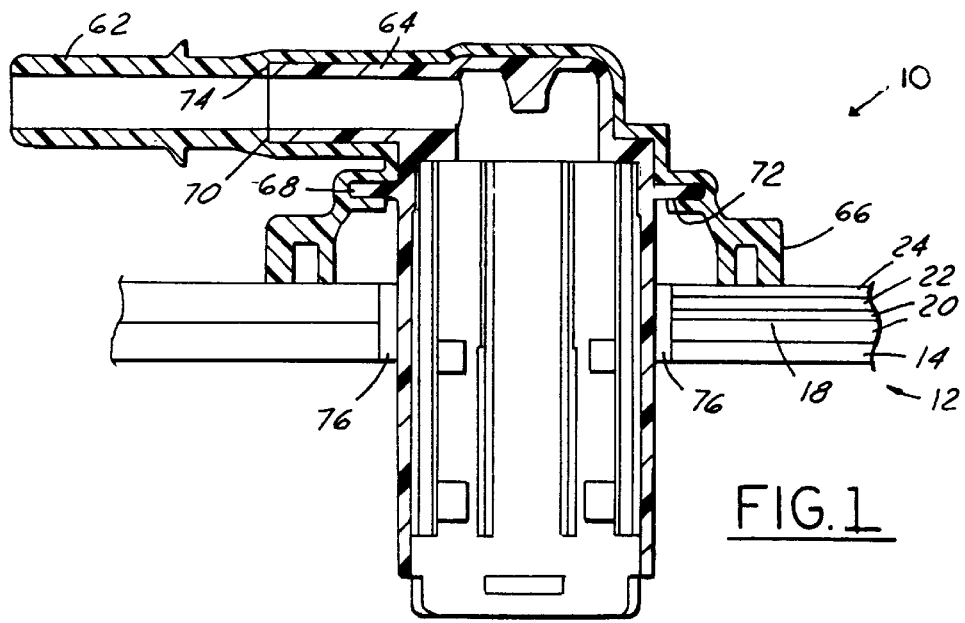
FIG. 1 is a multilayer plastic fuel tank having a roll over valve attachment according to the prior art.

Referring now to FIG. 1, a multilayer plastic fuel tank 10 is illustrated that is commonly used in the automotive industry. The tank 10 is typically produced in a continuous blow molding process in much the same way small plastic bottles are produced. The walls 12 of the tank 10 are composed of multilayers of plastic. The innermost layer 14 and outermost layer 24 of the walls 12 are made of high-density polyethylene (HDPE); typically a small amount of carbon black is compounded with the HDPE in the outermost layer 24. A thick regrind layer 22 is made mainly of HDPE, since regrind is obtained from scrap generated in the production process. A thin ethylene vinyl alcohol (EVOH) copolymer layer 18 in the middle of the wall 12 provides the barrier that essentially eliminates hydrocarbon permeation. An adhesive 20 of functionalized low density polyethylene (LDPE) is placed on each side of the EVOH layer 18 to ensure that the EVOH layer 18 is bonded to the innermost layer 14 and regrind layer 22. Of course, other materials may be used as either outer layers or barrier layers. For example, nylon may be used as a barrier layer.

FIG. 1 also shows one attachment, a roll over valve 60, which is typically attached to a fuel tank 12. The roll over valve 60 has a layer of HDPE 62 molded over an acetal layer 64. The layer of HDPE 62 is typically 1–2 mm in thickness. The roll over valve has a flange 66 for welding the roll over valve 60 to the outermost layer 24 of the fuel tank wall 12.

The present design of the roll over valve 60 suffers from two shortcomings. First, because there is no adhesive bond between the acetal layer 64 and the HDPE layer 62, a leakage path for hydrocarbons exists starting at point 68 and extends to point 70 and point 74. Similarly, a second leakage path starts at point 72 and extends to point 74 and point 70. Hydrocarbon fuel can easily leak through these path channels and escape through the HDPE layer 62 at points 70, 72 and 74, as HDPE is a poor permeation barrier.

Second, a large gap 76 exists between the fuel tank wall 12 and the roll over valve 60 at its attachment point. Thus, the polyethylene flange 66 is directly exposed to fuel during rollover situations and fuel vapor during normal operating modes. Again, because HDPE is a poor permeation barrier, significant permeation of hydrocarbons occurs through the polyethylene flange 66.

Figure 2:
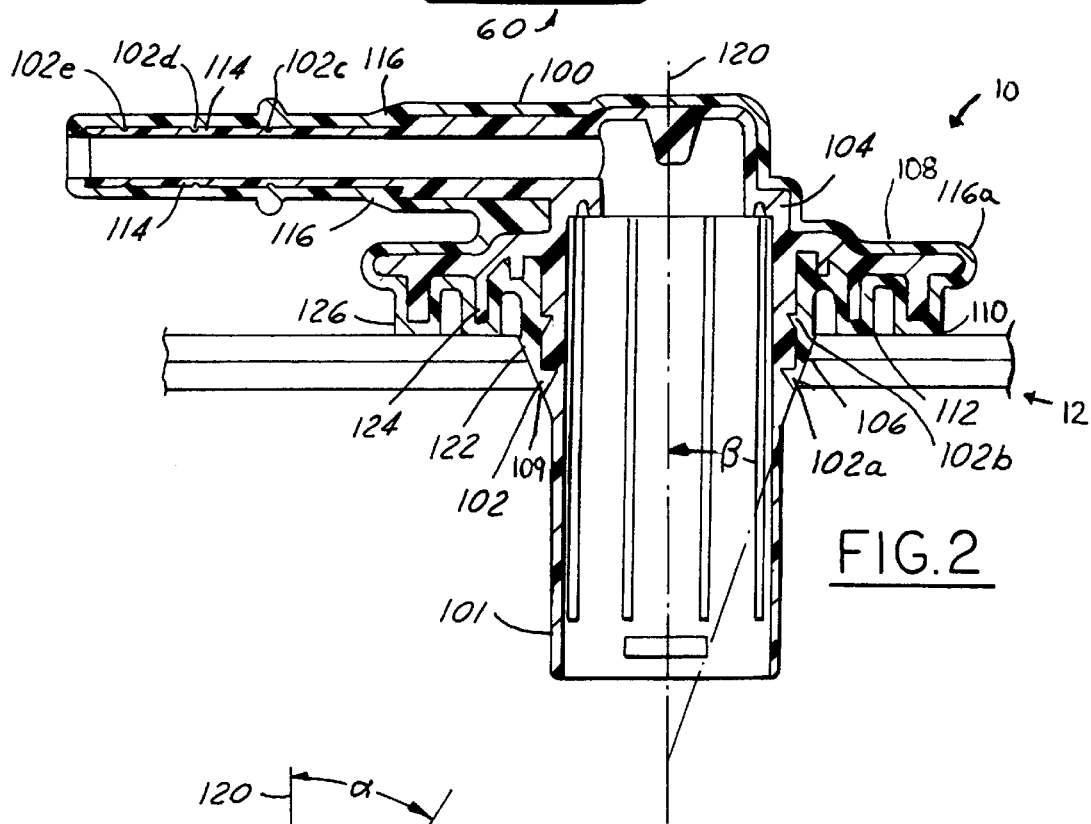
FIG. 2 is a roll over valve according to a preferred embodiment of the present invention.
Figure 3:
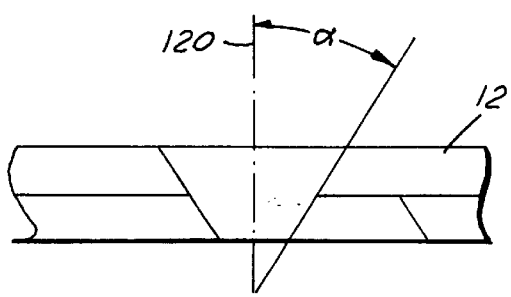
FIG. 3 is an illustration of the tank opening geometry of FIG. 2.

FIGS. 2 and 3 shows an improved strategy for attaching a roll over valve 100 to the tank wall 12 according to a preferred embodiment to reduce hydrocarbon emissions from the plastic fuel tank through the roll over valve 100. The new strategy modifies the old design in four fundamental ways. First, a series of cavities 102a, 102b, 102c, 102d, 102e, or grooves (not shown), are added a various locations to the acetal core 101. As the HDPE overmolding 116 is exposed to hydrocarbon vapor, the overmolding 116 will swell within the cavities 102a, 102b, 102c, 102d, 102e or grooves to provide locks that close the leak path at the interface between the acetal core 101 and the HDPE overmolding 116. In the preferred embodiment of the present invention, two of the series of cavities 102a, 102b are added in the portion of the rollover valve 100 between the flange 108 and the tank wall 12 that serves as the attachment point to the tank wall 12. Also, cavities 102c, 102d, 102e are located on the opposite end of the flange 108 in the area that serves as an attachment point to a fuel line (not shown). Of course, the size and location of these cavities, or grooves, may be modified depending upon the requirements of the system.

Second, the polyethylene overmolding 116 in the area corresponding to the tank wall 12 is conically shaped, rather than cylindrically shaped. Further, as best shown in FIG. 3, the tank wall 12 is cut at an angle α to the roll over valve 100, rather than perpendicular as in FIG. 2 Preferably, this angle α is between 8 and 40 degrees relative to a center line 120. To attach the roll over valve 100 to the fuel tank 10, the conical portion 106 is substantially mated with a portion of the tank wall 12. The conical portion 106 is designed such that the angle β, corresponding to the angle of the conical portion 106 relative to a center line 120, is slightly less than the angle α. This slight difference in angles ensures that the conical portion 106 is sealed to the wall 12 at a position 109, thereby ensuring no gap exists for hydrocarbon permeation as in FIG. 2 above.

Third, the length of the acetal portion 104 is extended into the flange 108. The overmolded portion 116 is correspondingly lengthened to include an overmolded flange portion 116a to surround the acetal portion 104. This lengthening will increase the length of the diffusion path of hydrocarbon molecules in the overmolded portion 116 and overmolded flange portion 116a of the roll over valve 100. This results in lower hydrocarbon emissions through the roll over valve 100.

Fourth, acetal feet 110, 112 have been added to the feet of the flange 108. The feet 110, 112 have two purposes. First, upon exposure to fuel or hydrocarbon vapor, the feet 110, 112 generate compressive stresses on the overmolded polyethylene 116 between points 122 and 124 and between points 124 and 126. These stresses cause the overmolded polyethylene 116 to press against the acetal cores 101 to further interrupt the leak path of hydrocarbon vapor. Second, the presence of the feet 110, 112 adds additional barrier protection from hydrocarbon permeation.

While each of the four modifications listed above reduce residual vapor emissions individually, the strategy employed by using them collectively may have a significant impact on minimizing evaporative emissions due to both leakage a nd permeation. Studies indicate that the implementation of the four modifications in a collective approach could reduce emissions in an attachment by a factor of 10 or more.

While the invention has been described in terms of improvements to a roll over valve 100 used in a plastic fuel tank 10, it will be understood, of course, the above teachings could be applied to most other attachments to a multilayer plastic fuel tank 10. For example, the teachings of the present invention may be applied to shut-off tubes, filler pipes, or to the plugs used to close holes made by a blow pin or needle.

Further, while the above invention is described in terms of acetal cores and polyethylene layers, the invention is meant to cover any other design that embodies the principles taught here since modifications may be made by those skilled in the art, particularly in light of the foregoing teachings. For example, nylon cores may be used in place of acetal cores 101.

What is claimed is:

1. A method for decreasing hydrocarbon emissions from a plastic fuel tank assembly having a multilayer plastic fuel tank and an overmolded fuel tank attachment, wherein said multilayer plastic fuel tank has a multilayer fuel tank wall and wherein the overmolded fuel tank attachment has a barrier resistant core and a polymeric outerlayer, the method comprising the steps of:

exploiting the swelling properties of the polymeric outerlayer to close possible leakage paths between the barrier resistant core and the polymeric outerlayer.

2. The method of claim 1 further comprising the step of exploiting the barrier properties of the barrier resistant core to increase the length of the diffusion path of hydrocarbon molecules out of the multilayer plastic fuel tank assembly.

3. The method of claim 1, wherein the step of exploiting the swelling properties of the polymeric outerlayer to close possible leakage paths between the barrier resistant core and the polymeric outerlayer comprises the step of providing at least one cavity portion to the barrier resistant core, wherein the polymeric outerlayer is capable of swelling within said at least one cavity portion to close possible leakage paths between the barrier resistant core and the polymeric outerlayer.

4. The method of claim 1, further comprising the steps of:

providing a conical portion on the overmolded fuel tank attachment having a first angle relative to a central axis of the overmolded fuel tank attachment;

angling the attachment point of the multilayer tank wall to a second angle relative to said central axis of the overmolded fuel tank attachment; wherein said second angle is slightly larger than said first angle;

sealing said conical portion to said attachment point on the multilayer tank wall.

5. The method of claim 4, wherein the step of angling the attachment point of the multilayer tank wall to a second angle relative to said central axis of the overmolded fuel tank attachment comprises the step of angling the attachment point of the multilayer tank wall to a second angle, said second angle between 8 and 40 degrees relative to said central axis of the overmolded fuel tank attachment.

6. The method of claim 2, wherein the step of exploiting the barrier properties of the barrier resistant core to increase the length of the diffusion path of hydrocarbon molecules out of the multilayer plastic fuel tank assembly comprises the step of extending the barrier resistant core within a flange of said polymeric outerlayer.

7. The method of claim 6 further comprising the step of adding at least one acetal foot to said extended portion, wherein a bottom portion of said at least one acetal foot is closely coupled with a portion of said flange that is closely coupled with an outer surface of the multilayer tank wall.

8. A plastic fuel tank attachment for use on a multilayer plastic fuel tank, the attachment comprising:
   a plastic barrier portion, said plastic barrier portion having at least one cavity portion; and
   a plastic overmolded portion molded onto said barrier portion, wherein said plastic overmolded portion is capable of swelling into said at least one cavity portion when exposed to a hydrocarbon permeant.

9. The attachment of claim 8, wherein said plastic overmolded portion having a conical region, wherein said conical region is coupled with a fuel tank wall of the multilayer plastic fuel tank to mechanically seal said plastic overmolded portion to the multilayer plastic fuel tank.

10. The attachment of claim 9, wherein said plastic overmolded portion also having a flange coupled with an outer surface of the multilayer plastic fuel tank, wherein said flange provides additional hydrocarbon permeation prevention from the multilayer plastic fuel tank to the atmosphere.

11. The attachment according to claim 10, wherein said plastic barrier portion extends within said flange.

12. The attachment according to claim 11, wherein said plastic barrier portion having at least one foot, said at least one foot located within said flange and closely coupled with said outer surface of the multilayer plastic fuel tank.

13. The attachment according to claim 8, wherein said plastic overmolded portion is comprised of high density polyethylene and said plastic barrier portion is comprised of an acetal resin.

14. A multilayer plastic fuel tank assembly comprising:
   an attachment having an inner barrier portion and an outer overmolded portion, said outer overmolded portion having a conical portion, said conical portion having a first angle relative to a central axis of said attachment; and
   a multilayer plastic fuel tank having a tank wall, wherein a portion of said tank wall is cut at an a second angle relative to said central axis of said attachment, wherein said portion of said tank wall is mechanically coupled to said conical portion to seal said outer overmolded portion to said multilayer plastic fuel tank.

15. The multilayer plastic fuel tank assembly of claim 14, wherein said second angle is between 8 and 40 degrees relative to said central axis of said attachment.

16. The multilayer plastic fuel tank assembly of claim 14, wherein said outer overmolded portion also having a flange coupled with an outer surface of said tank wall, wherein said flange provides additional hydrocarbon permeation prevention from the multilayer plastic fuel tank to the atmosphere.

17. The multilayer plastic fuel tank assembly of claim 16, wherein said inner barrier portion extends within said flange.

18. The multilayer plastic fuel tank assembly of claim 17, wherein said inner barrier portion having at least one foot, said at least one foot located within said flange and closely coupled with said outer surface of said tank wall.

19. The multilayer plastic fuel tank assembly of claim 14, wherein said outer overmolded portion is comprised of high density polyethylene and said barrier portion is comprised of an acetal resin.

20. The multilayer plastic fuel tank assembly of claim 14, wherein said attachment is selected from the group consisting of a roll over valve, a shut off tube, a filler pipe and a closure plug.

\* \* \* \* \*